(12) United States Patent
Arias López

(10) Patent No.: US 7,537,514 B2
(45) Date of Patent: May 26, 2009

(54) DOUBLE CASING WITH NETTING FOR FOOD PRODUCTS AND PRODUCTION METHOD THEREFOR

(75) Inventor: Juan Luis Arias López, Pamplona (ES)

(73) Assignee: Viscofan, S.A. (ES)

( * ) Notice: Subject to any disclaimer, the term of this patent is extended or adjusted under 35 U.S.C. 154(b) by 444 days.

(21) Appl. No.: 10/471,917

(22) PCT Filed: Mar. 12, 2002

(86) PCT No.: PCT/ES02/00111

§ 371 (c)(1),
(2), (4) Date: Feb. 13, 2004

(87) PCT Pub. No.: WO02/074093

PCT Pub. Date: Sep. 26, 2002

(65) Prior Publication Data

US 2005/0032470 A1    Feb. 10, 2005

(30) Foreign Application Priority Data

Mar. 15, 2001   (ES)   ................ 200100602

(51) Int. Cl.
*A22C 11/00*   (2006.01)
(52) U.S. Cl. ...................................... 452/35
(58) Field of Classification Search ............. 452/21–29, 452/30–35, 37–39, 46–48, 51; 53/449, 459, 53/170, 574–576, 450
See application file for complete search history.

(56) References Cited

U.S. PATENT DOCUMENTS

| | | | | |
|---|---|---|---|---|
| 4,422,215 A * | 12/1983 | Liekens et al. | ............... | 138/109 |
| 4,466,465 A * | 8/1984 | Frey | ......................... | 138/118.1 |
| 4,470,171 A * | 9/1984 | Rusmussen et al. | ......... | 138/120 |
| 4,924,552 A * | 5/1990 | Sullivan | ....................... | 452/24 |
| 4,993,210 A * | 2/1991 | Kollross | ....................... | 53/428 |
| 5,024,041 A * | 6/1991 | Urban et al. | .................... | 53/449 |
| 5,038,832 A * | 8/1991 | Mahoney et al. | ............ | 138/109 |
| 5,154,543 A * | 10/1992 | Houck et al. | ................. | 405/303 |
| 5,215,495 A * | 6/1993 | Crevasse | ...................... | 452/21 |
| 5,634,317 A * | 6/1997 | Bylenga | ....................... | 53/170 |
| 5,709,068 A * | 1/1998 | Bylenga | ....................... | 53/449 |
| 5,980,374 A * | 11/1999 | Mercuri | ....................... | 452/21 |
| 6,183,826 B1 * | 2/2001 | Quinones et al. | ............ | 428/34.8 |
| 6,846,234 B1 * | 1/2005 | Hergott et al. | ................. | 452/32 |
| 7,051,415 B2 * | 5/2006 | Pinto et al. | ................. | 29/455.1 |
| 7,063,610 B2 * | 6/2006 | Mysker | ....................... | 452/30 |
| 7,195,551 B2 * | 3/2007 | Shefet | ......................... | 452/32 |

* cited by examiner

*Primary Examiner*—Thomas Price
(74) *Attorney, Agent, or Firm*—Schiff Hardin LLP

(57) ABSTRACT

A casing is embodied as a hollow stiff cylindrical support provided with an attachment mechanism in its coupling to the stuffing horn, on which is placed a suitably shirred tube which in turn is coated with a separation sheet and finally by a tubular net, also compressed or shirred, and which together with the inner tube extends beyond the support tube and is clamped against the tube by a clip, staple or knot such that during the stuffing operation the shirred tube and the equally shirred net are axially extended, with a simultaneous yet independent extension of the two elements favored with the aid of the intermediate separation sheet.

20 Claims, 3 Drawing Sheets

DOUBLE CASING WITH NETTING FOR FOOD PRODUCTS AND PRODUCTION METHOD THEREFOR

BACKGROUND OF THE INVENTION

The invention relates to a double casing for food products, comprised of a flexible tube of an edible or inedible material, shirred, that is externally coated with a length equivalent to the amount of the tube of a tubular net, elastic, semi-elastic or non-elastic disposed coaxially to the tube and compressed or shirred in the same extent as the tube is shirred, so that it occupies an equivalent length.

The beginning of the compressed or shirred tubular net is slightly displaced from the beginning of the shirred tube, so that a few centimeters of the latter are not coated. Between the shirred tube and the compressed tubular net can be provided a cylindrical separation sheet made of any material, such as a plastic film.

The above described assembly can be internally supported by a hollow cylinder made of a stiff material.

The above system, continuously or discontinuously and by way of a simultaneous unshirring of the film and the net, can provide a double wrapping formed by the overlapping film and the tubular net that that can be filled by closing the film and the net jointly on the open end and stuffing inside a solid or semisolid product with a stuffing horn placed inside the support tube of the assembly.

The area of shirred film not coated by the compressed or shirred tubular net ensures that the latter will not prevent the shirred film from unfolding easily because of the compression force exerted on it. As the film and the net are unshirred to form the casing, the front ends of the shirred film and net move back in the same extent, so that there is always an area of uncoated and free shirred film. The separation sheet allows the film to become unshirred uniformly and ensures that the portion of shirred film that is not coated by the compressed net is not carried away by the latter as it unfolds.

The product described can be used for manual or automatic packaging of food products that may or may not be later subjected to any processes of drying, maturing, curing, cooking, sterilization, etc., in which the film casing and outer net assembly are required.

The invention also relates to the method for manufacturing said product.

The use of double casings for meat products, and specifically those externally including string, mesh or nets has been traditionally employed for several purposes, among which are the following:

1) As a decorative mechanism in order to give the product an external appearance with a greater finish in some cases, or more traditional and artisan-like in others. In other cases, the object is to ensure that the finished product maintains the characteristic mark made by the net after the casing is removed.

2) As an additional compression system for the first casing, so that air is eliminated more effectively to obtain an improved appearance and conservation of the products, or to hold tightly the stuffed product during the cooking process in order to achieve a proper bonding of the meat. For products undergoing a drying process, the mesh, string or net help the tripe remain joined to the surface of the product despite the shrinkage resulting from the drying process.

3) As a system for holding the inner casing so that the entire stuffed piece maintains a uniform gauge. This is important for casings made of plastic, collagen or regenerated cellulose of large caliber with a tendency for their diameter to vary. Coating these pieces with semi-elastic or non-elastic nets helps solve this problem.

4) As a system for hanging the products, whether for their heat treatment in cooking ovens or for a drying process. The external coating of string, mesh or net provides, in addition to a basic hanging system, an effective support for the weight of the product which in many cases keeps the casing from breaking.

Traditionally, this second external casing is placed manually as an additional operation after the first casing is stuffed. This operation has always been labor-intensive.

One of the first improvements of the traditional method is described in U.S. Pat. No. 1,505,218 (Sartore, 1924) and consists of a double casing comprising an inner cylindrical tube coated by a cylindrical net. This double casing is cut into segments of a length matching that of a piece of the final product to be stuffed. The advantages provided over the traditional method is to give the internal piece a greater resistance, so that it can be stuffed at a higher pressure, thereby eliminating the air more efficiently and reducing the number of breakages, but above all, reducing the time required to place the net after stuffing with the ensuing savings in labor costs.

A second improvement is described in U.S. Pat. No. 5,024,041 (Urban, 1991), which describes a method where both the inner casing and the outer net are shirred, the former on the stuffing tube of a stuffing machine and the latter on a tube concentric to the aforementioned one having a large enough inner diameter, so that with the two closed by a staple or clip it is possible to perform the stuffing continuously and automatically. This invention also incorporates a retainer brake for the first casing. In addition to these advantages the system also allows a faster stuffing operation.

U.S. Pat. No. 5,980,374 (Mercuri, 1999) provides an additional improvement, and consists of a double casing comprising an inner tubular casing and an outer elastic cylindrical net placed concentrically to each other and later shirred jointly. The advantage is that both components form a single piece and can be used as a traditional simple casing, placing them on the stuffing horn without requiring additional tubes to place the net, and further preventing the need to load said net.

Although all of the aforementioned inventions constitute important improvements of the system, there remain a few significant aspects to resolve. The system disclosed by U.S. Pat. No. 5,024,041 (Urban, 1991), although providing a continuous stuffing method, requires an additional tube to support the net and a system for attaching said tube to the stuffing machine. Additionally, the net must be loaded on this tube in a separate operation, with the corresponding additional time and labor costs. Furthermore, each time the inner casing or net is finished, which are not always simultaneous, it is necessary to stop the operation to replace the exhausted supply. This also slows down the system and increases labor costs.

The system described in U.S. Pat. No. 5,980,374 (Mercuri, 1999), although solving some of the aforementioned problems, such as the need for accessories to support the net, and somewhat reducing the number of stoppages for placing either the inner casing or the net, as their length is substantially the same in each unit of double shirred casing, this approach has a disadvantage in that said length is limited because of the joint shirring of the two components. Thus, in the shirred stick, the length of double casing contained in each fold is at most the distance between the elastic transversal threads of the net, as during the shirring operation and as described in the corresponding patent, the elastic transversal threads are placed spontaneously at the troughs of the folds, thereby limiting the length of the double casing contained in each one. In addition, the number of folds per unit length contained in the stick depends on the thickness of each fold, that is, the sum of the thickness of the inner casing and the thickness of the elastic thread.

SUMMARY OF THE INVENTION

All of these disadvantages are satisfactorily solved by the present invention, the objects of which are summarized as follows.

In view of the above discussion, it is an object of the invention to provide a double casing for food products comprised of a flexible inner tube and an outer net, both shirred independently and placed coaxially, ready to be used, allowing a simultaneous application of the flexible tube and the net to any product, preferably a food product, stuffed inside it.

Also the object of the invention is to provide a system that renders it unnecessary to place accessories for supporting the nets in the stuffing machines, that prevents the costly operation of loading the net in said accessories and additional stoppages in order to replace the two different packaging elements, the cylindrical casing and the net, which are not always exhausted at the same time, thereby reducing the cost of the operation. As a corollary, it can be added that the system is applicable to any stuffing machine.

A further object of the invention is to provide a double casing that can contain larger amounts of tube and net in considerably shorter lengths of shirred product stick than in traditional systems, by virtue of the coaxial arrangement of the tube and the net, allowing an independent and more compact shirring thereof.

Yet another object of the invention is to facilitate the joint unshirring of the tube and the net during the use of the double casing by placing a separation sheet between them.

Lastly, another object of the invention is to prevent the externally shirred net from hindering the unshirring of the inner tube by placing the former farther back than the latter.

DESCRIPTION OF THE DRAWINGS

As a complement of the description being made and in order to aid a better understanding of the characteristics of the invention, according to an example of a preferred embodiment, an accompanying set of drawings is provided as an integral part of the description where for purposes of illustration only and in a non-limiting sense the following is shown.

DETAILED DESCRIPTION OF THE PREFERRED EMBODIMENTS

Figure 1:
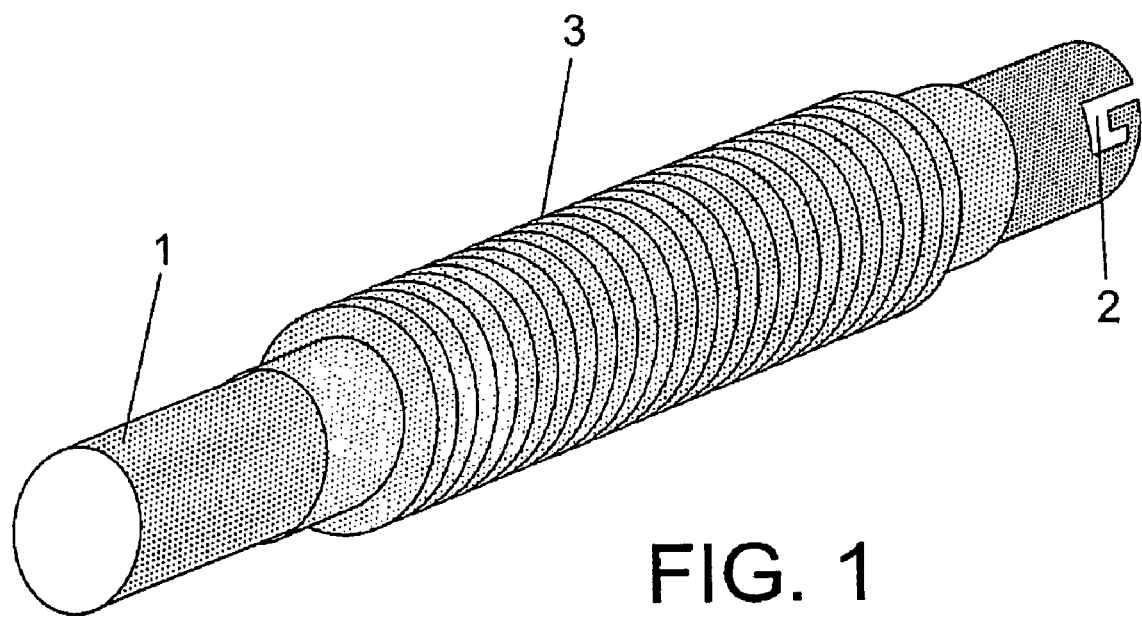
FIG. 1 is a schematic perspective representation of a tube for wrapping food products, made of an edible or inedible material, shirred on a hollow support cylinder made of a stiff material.
Figure 2:
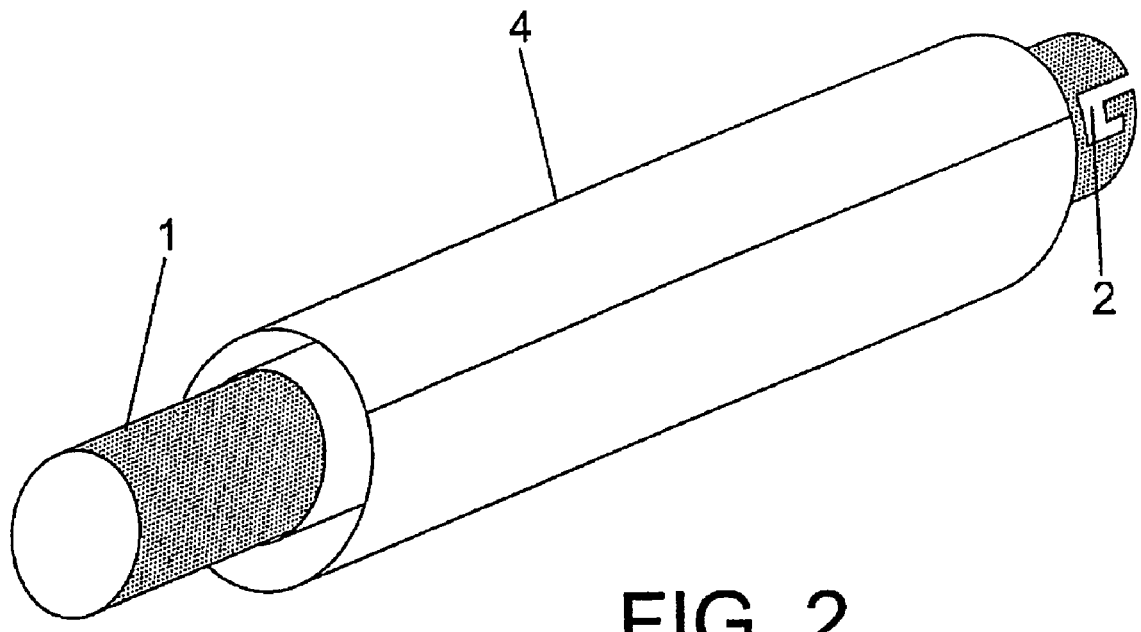
FIG. 2 is a perspective view similar to the previous figure of the same assembly after the separation sheet has been incorporated.

The figures are provided only for purposes of illustrating preferred embodiments of invention, the scope of which includes other arrangements or designs of both the tube, the nets and the protection sheets and/or hollow support cylinders.

FIGS. 1-4 illustrate embodiments of the invention that are shown comprising a support tube 1 made of a stiff material having an attachment mechanism 2 securing it to the stuffing horn, on which is placed a suitably shirred tube 3 with this assembly being coated with a separation sheet 4 and finally with a tubular net 5, also suitably compressed or shirred, and that together with the inner tube 3 extends beyond the support tube 1 and is strangled against it by a clip, knot or staple 7.

The support tube 1 is a stiff tube made of any material, preferably one suitable for being in contact with food products. Its length, inner diameter and wall thickness can vary according to the width of the tube, the characteristics of the net, the length of the stuffing horn of the machine used to fill it, the total length of the tube and net to be shirred and compressed, etc.

The stuffing horn on which the system is placed will determine the minimum inner diameter of the hollow support cylinder, so that the former will fit inside the latter. The same is true of its length, as the stuffing horn must always be longer than the hollow support cylinder for the tube. The thickness of the wall of the hollow support cylinder will mainly depend on its strength, and should be enough to withstand, without deformation, the pressure transmitted by the net, particularly when the net is elastic. The hollow support cylinder can have any attachment mechanism to the stuffing horn and can be perforated to allow wetting the inner shirred tube before it is used whenever this is necessary.

The tube 3 can be made of an edible or inedible material, preferably one suitable for being in contact with food products, shirred in an accordion-like manner to form folds perpendicular only to its longitudinal axis, or also parallel to said axis, in order to contain the greatest possible length in a minimal space.

In order to allow the air that is trapped when stuffing the product to exit during the heat treatment, the tube can be previously perforated. The size and distribution of the orifices can be variable and should allow air to exit, yet ensure retention of fluids and the mechanical strength of the tube.

The separation sheet 4 for the shirred tube 3 and the net 6 that is later placed can be made of any material, preferably one suited to come in contact with food products; its purpose is to separate the shirred tube from the compressed net so that when the two are simultaneously deployed, the friction and drag of the film by the net is prevented, so that the deployment is uniform and the tube is not damaged by the net. It can consist of an enveloping sheet with the edges glued to form a tube, or can be formed as a tube directly, or can be a simple enveloping sheet suitably overlapped. This sheet is attached to the hollow support cylinder on the rear to prevent the sheet from being carried away by the net when the latter is extended. It can be attached to the tube by an adhesive or by any other suitable method.

Finally, the net 5 comprises a sock or tube-shaped weave with walls made of threads, fibers or string of vegetable-origin materials such as cotton and/or latex, synthetic materials or a mixture thereof, suitably intertwined to form a characteristic weave. The most common nets comprise an elastic thread coated with a cotton or synthetic fiber, arranged in a spiral along the entire length of the sock or tube, with adjacent coils attached to each other by threads knotted at regular intervals forming a grid closed onto itself in which the transverse fibers are elastic and the longitudinal ones are not. There are also semi-elastic nets in which the weave has a certain degree of elasticity, as well as non-elastic nets. In the latter case the threads can determine a great variety of weaves, forming diamonds, hexagons, etc.

Figure 4:
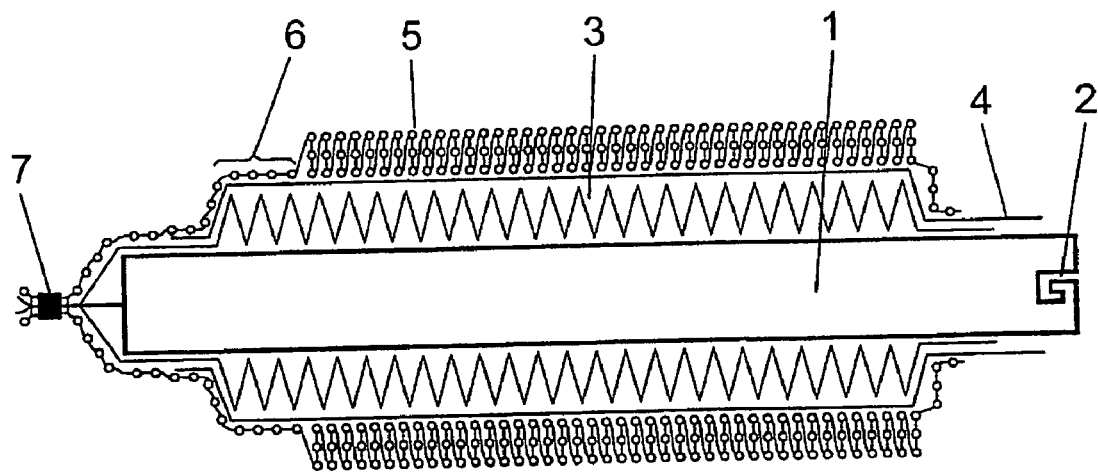
FIG. 4 is a schematic side elevation and sectional view of the assembly of the previous figure.

The net 5 is compressed similarly to the shirring of the inner tube 3 for non-elastic and semi-elastic nets; however, for elastic nets, the elastic coils of the spiral that form the transverse rings of the net are arranged concentrically as shown in FIG. 4, remaining by their elasticity such that unshirring can take place smoothly, so that the net that is still compressed or shirred will not press against the net that is being deployed at any time, as at all times and because of the manner in which the double casing is prepared, which is also part of the scope of the invention and that will be described further below, the order of compression or shirring of the net is opposite to that of decompression or unshirring, that is, the last portion of net deployed is the first to be compressed. This system allows compressing or shirring a great length of tubular net in a small space.

Figure 3:
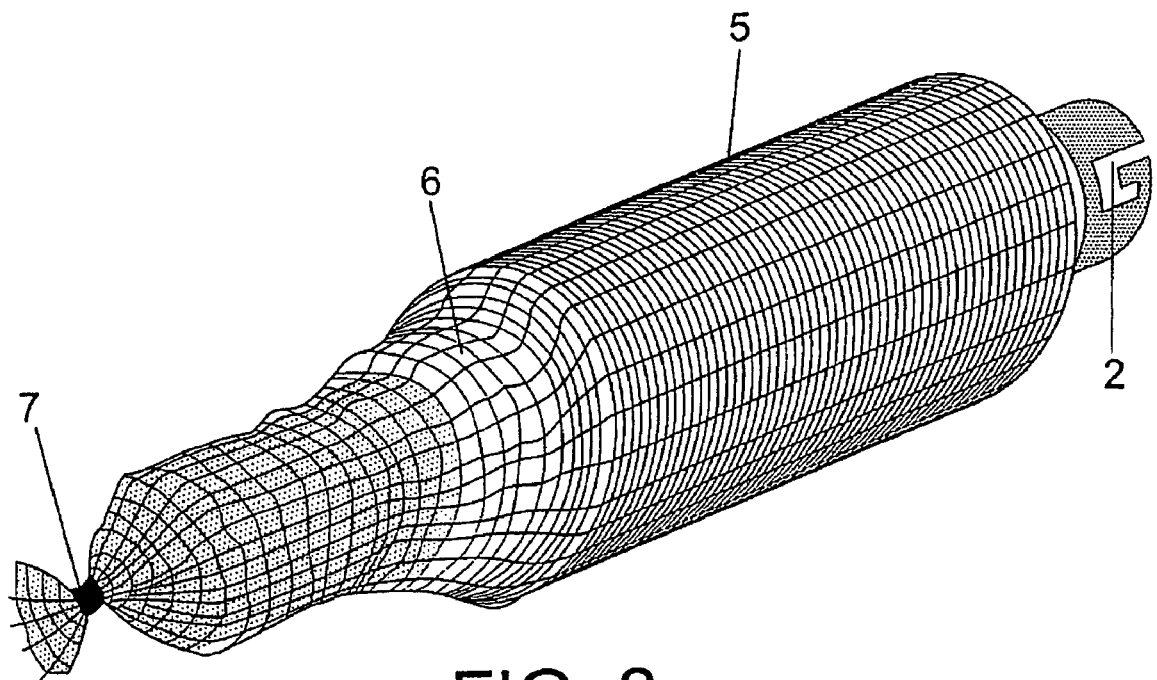
FIG. 3 is another perspective view similar to those of the previous figures, after incorporating the external net.

The assembly formed by the compressed net, which comprises a length of net substantially equal to that of the shirred tube, is placed a few centimeters behind 6 the assembly of the shirred tube (FIG. 3). The reason for this is so that the front of the film is never pressed on by the net and is thus free to be unshirred during the stuffing operation. As the assembly is extended both fronts, that of the shirred tube and that of the compressed net, are retracted in parallel and keep this safety distance 6 at all times.

The assembly can incorporate a clip, knot or staple on its open end, as a closure, so that it is not necessary to perform this operation at the start of the stuffing operation.

Figure 5:
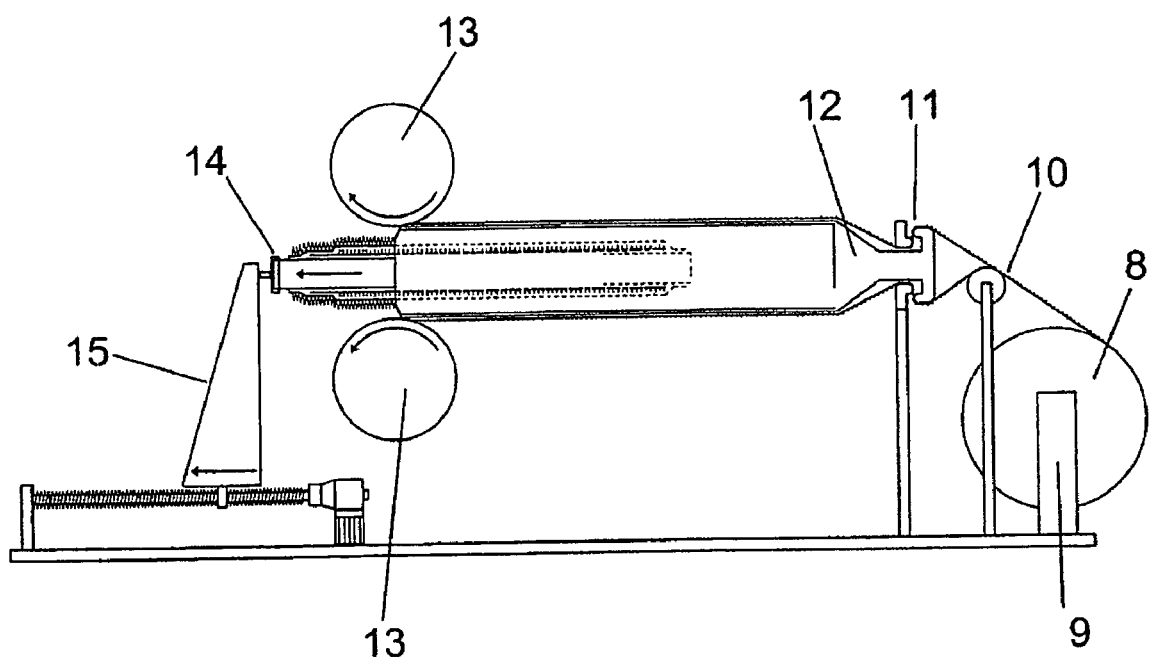
FIG. 5 is a schematic side view of a machine used to place the net.

In order to manufacture the described product, in its most developed version, a commercially available cylindrical hollow stick of flexible shirred tube 3 made by any known method is used, inside which is placed a hollow support cylinder 1. After this assembly is coated with the separation sheet 4 the net is placed and shirred, by a machine as that shown in FIG. 5.

Specifically, in this machine, a coil of net 8 is placed in the coil-bearing system 9 of the machine and a certain length of net is unwound, making it pass through a tensioning roller 10 and then threading it in the rear end of a floating spindle 12 until it is placed under the carrier wheels 13 of the net.

Then the stick of the shirred cylindrical tube 3 is mounted on the hollow cylindrical support 1 and is placed after it is coated with the separation sheet 4 on the support 14 for the stick retraction system 15, and the latter is placed inside the hollow floating spindle 12 until the end of the shirred film is inserted a few centimeters in the spindle.

Afterwards the carrier wheels 13 and the stick retraction system 15 are set in motion so that the net falls on the stick as the latter retracts, coating it with an amount of net equivalent in length to that of the previously shirred film. The density of the net shirred in this manner will be determined by the speeds of the carrier wheels 15 and the retraction system 15.

EXAMPLES

In order to define the scope and characteristics of the invention, the following examples are provided as illustrating preferred embodiments, and not to limit the scope of the invention.

Example 1

Two sticks with a double tube and net casing were manufactured, one according to the system described in the description of the preferred embodiments, which is referred to as the "independent coaxial arrangement" of the tube and net sticks, and the other by shirring jointly and simultaneously the tube and the net to form a single stick. The relevant data of the materials used and the dimensions of the sticks produced are shown below in the following table:

TABLE 1

|  | Independent coaxial arrangement | Joint arrangement |
|---|---|---|
| External diameter of the hollow support cylinder | 53 mm | 53 mm |
| Diameter of the inner tube-casing | 70 mm | 70 mm |
| Thickness of the inner tube-casing | 0.0875 mm | 0.0875 mm |
| Inner tube-casing material | Fibrous | Fibrous |
| Separation sheet | Polyethylene 0.04 mm | — |
| Gauge of the latex thread of the net | 0.9 mm | 0.9 mm |
| Distance between net coils | 15 mm | 15 mm |
| Type of latex/polyester elastic net | 12 spaces/5 knots | 12 spaces/5 knots |
| Total length of double casing stick | 430 mm | 430 mm |
| Total meters shirred | 30 m | 6 m |
| Shirring ratio: casing length/stick length | 69.76 | 13.95 |

Table 1 shows that the stick manufactured according to the system described a preferred embodiment has 30 meters of double casing as compared to the 6 meters contained in the one manufactured with the joint shirring method, both on 430 mm of stick, that is, 5 times more. The shirring ratios are respectively 69.76 and 13.95 meters of double casing per meter of stick.

Example 2

Two sticks with a double tube and net casing were manufactured, one according to the system described in the description of the preferred embodiments, which is referred to as the "independent coaxial arrangement" of the tube and net sticks, and the other by shirring jointly and simultaneously the tube and the net to form a single stick. The relevant data of the materials used and the dimensions of the sticks produced are shown below in the following table:

TABLE 2

|  | Independent coaxial arrangement | Joint arrangement |
|---|---|---|
| External diameter of the hollow support cylinder | 63 mm | 63 mm |
| Diameter of the inner tube-casing | 80 mm | 80 mm |
| Thickness of the inner tube-casing | 0.0875 mm | 0.0875 mm |
| Inner tube-casing material | Collagen | Collagen |
| Separation sheet | Polyethylene 0.04 mm | — |
| Gauge of the latex thread of the net | 0.7 mm | 0.7 mm |
| Distance between net coils | 8 mm | 8 mm |
| Type of latex/polyester elastic net | 14 spaces/3 knots | 14 spaces/3 knots |
| Total length of double casing stick | 500 mm | 500 mm |
| Total meters shirred | 25 m | 7.12 m |
| Shirring ratio: casing length/stick length | 50 | 14.24 |

Table 2 shows that the stick manufactured according to the system described in the invention has 25 meters of double casing as compared to the 7.12 meters contained in the one manufactured with the joint shirring method, both on 500 mm of stick, that is, 3.5 times more. The shirring ratios are respectively 50 and 14.24 meters of double casing per meter of stick.

Example 3

Two sticks with a double tube and net casing were manufactured, one according to the system described in the description of the preferred embodiments, which is referred to as the "independent coaxial arrangement" of the tube and net sticks, and the other by shirring jointly and simultaneously the tube and the net to form a single stick. The relevant data of the materials used and the dimensions of the sticks produced are shown below in the following table:

TABLE 3

|  | Independent coaxial arrangement | Joint arrangement |
| --- | --- | --- |
| External diameter of the hollow support cylinder | 63 mm | 63 mm |
| Diameter of the inner tube-casing | 90 mm | 90 mm |
| Thickness of the inner tube-casing | 0.05 mm | 0.05 mm |
| Inner tube-casing material | Polyamide | Polyamide |
| Separation sheet | Polyethylene 0.04 mm | — |
| Gauge of the latex thread of the net | 0.7 mm | 0.7 mm |
| Distance between net coils | 8 mm | 8 mm |
| Type of latex/polyester elastic net | 14 spaces/3 knots | 14 spaces/3 knots |
| Total length of double casing stick | 270 mm | 430 mm |
| Total meters shirred | 16 m | 6.6 m |
| Shirring ratio: casing length/stick length | 59.26 | 15.34 |

The table shows that the stick manufactured according to the system described in the description of the preferred embodiments has 16 meters of double casing as compared to the 6.6 meters contained in the one manufactured with the joint shirring method, the first on 270 mm of stick and the second on 430 mm of stick, that is, almost 4 times more double casing per unit length of stick in the independent coaxial arrangement. The shirring ratios are respectively 69.76 meters and 13.95 meters of double casing per meter of stick.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A double casing for food products, comprising:
a tube of an edible or inedible material; and
an elastic, semi-elastic or non-elastic tubular net, the tube and the net both being shirred independently and placed coaxially, the tube being coated externally by the net which is shirred to a same extent as the tube so that it occupies an equivalent length.

2. The double casing for food products, according to claim 1, wherein the tubular net is placed farther back than the tube.

3. The double casing for food products according to claim 1, further comprising a cylindrical separation sheet made of any material that is placed between the shirred tube and the net.

4. The double casing for food products according to claim 1, further comprising an internal support for the shirred tube, said internal support being made of a hollow support cylinder of a stiff material.

5. The double casing for food products according to claim 4, further comprising attachment mechanism of the hollow support cylinder for attachment to a stuffing horn.

6. The double casing for food products according to claim 4, wherein the hollow support cylinder is perforated.

7. The double casing for food products according to claim 1, wherein the material of the tube is edible collagen of bovine or porcine origin.

8. The double casing for food products according to claim 1, wherein the material of the tube is inedible collagen.

9. The double casing for food products according to claim 1, wherein the material of the tube is regenerated collagen.

10. The double casing for food products according to claim 1, wherein the material of the tube is regenerated or fibrous collagen.

11. The double casing for food products according to claim 1, wherein the material of the tube is a plastic material.

12. The double casing for food products according to claim 1, wherein the material of the tube is hemp paper.

13. The double casing for food products according to claim 1, wherein the material of the tube is any type of paper.

14. The double casing for food products according to claim 1, wherein the material of the tube is a polysaccharide.

15. The double casing for food products according to claim 1, wherein the material of the tube comprises a combination of materials selected from the group consisting of edible collagen of bovine or porcine origin, inedible collagen, regenerated collagen, regenerated or fibrous collagen, a plastic material, hemp paper, any type of paper, and a polysaccharide.

16. The double casing for food products according to claim 1, further comprising a coloring pigment or mixture of pigments added to the material of the tube, continuously or discontinuously, to form a drawing, stripes, letters, numbers or any other design.

17. The double casing for food products according to claim 1, further comprising an aromatic substance added to the material of the tube.

18. The double casing for food products according to claim 1, further comprising a plastic substance added to the material of the tube.

19. The double casing for food products according to claim 1, wherein the tube is perforated in order to allow its aeration.

20. The double casing for food products according to claim 1, further comprising a clip, staple, or other attachment mechanism for holding one of the ends of the double casing.

* * * * *